United States Patent
Luo et al.

(10) Patent No.: US 10,972,567 B2
(45) Date of Patent: Apr. 6, 2021

(54) MULTI-DIMENSIONAL TAGGING NAMESPACE FOR CLOUD RESOURCE MANAGEMENT

(71) Applicant: International Business Machines Corporation, Armonk, NY (US)

(72) Inventors: Lan Luo, Beijing (CN); Jing Bo Jiang, Beijing (CN); Li Ni Zhang, Beijing (CN); Yu Zhao, Beijing (CN); Li Jiang, Beijing (CN); Wen Rui Zhao, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 16/374,988

(22) Filed: Apr. 4, 2019

(65) Prior Publication Data

US 2020/0322442 A1    Oct. 8, 2020

(51) Int. Cl.
```
H04L 9/06      (2006.01)
G06F 15/16     (2006.01)
H04L 29/08     (2006.01)
G06F 3/06      (2006.01)
G06F 9/54      (2006.01)
```
(Continued)

(52) U.S. Cl.
CPC ...... *H04L 67/2804* (2013.01); *H04L 41/0618* (2013.01); *H04L 41/0672* (2013.01); *H04L 61/302* (2013.01); *H04L 61/3005* (2013.01); *H04L 67/1044* (2013.01)

(58) Field of Classification Search
CPC ............. H04L 67/2804; H04L 41/0618; H04L 41/0672; H04L 61/3005; H04L 61/302; H04L 67/1044
See application file for complete search history.

(56) References Cited

U.S. PATENT DOCUMENTS 9,191,615 B1 *  11/2015  Valimaki ................ H04N 7/147
9,787,598 B2    10/2017  Bertram et al.
9,853,913 B2 *  12/2017  Foskett ................... H04L 67/28
(Continued)

OTHER PUBLICATIONS

"Tags for cloud resources", ServiceNow Docs, https://docs.servicenow.com/bundle/london-it-operations-management/page/product/cloud-management-v2/concept/cloud-tagging.html, Nov. 9, 2018, 5 pgs.
(Continued)

*Primary Examiner* — David R Lazaro
*Assistant Examiner* — Berhanu Shitayewoldetadik
(74) *Attorney, Agent, or Firm* — Maeve M. Carpenter; Madeline F. Schiesser; Keohane & D'Alessandro, PLLC

(57) ABSTRACT

Approaches presented herein enable generation of a multi-dimensional tag metric in a cloud resource management environment. More specifically, a tagging namespace is provided for managing a resource in the cloud resource management environment. This namespace comprises at least two dimensions and a plurality of positions. A set of tags associated with the resource are received into the tagging namespace. A match of each tag of the set of tags to a position within the namespace into which that tag was received is verified and an alert is triggered in the case verification fails. Alternatively, in the case verification is successful, the tag-containing namespace is validated as a multi-dimensional tag metric.

20 Claims, 7 Drawing Sheets

(51) Int. Cl.
*H04L 12/24* (2006.01)
*H04L 29/12* (2006.01)

(56) References Cited

U.S. PATENT DOCUMENTS

| | | | | |
|---|---|---|---|---|
| 9,934,269 B1* | 4/2018 | Kahrs | ................. | G06F 16/9535 |
| 10,109,088 B1* | 10/2018 | Erickson | ............... | G06T 11/206 |
| 10,560,353 B1* | 2/2020 | Stickle | ................ | G06F 11/3452 |
| 2003/0187973 A1* | 10/2003 | Wesley | ................... | H04L 29/06 |
| | | | | 709/224 |
| 2006/0120526 A1* | 6/2006 | Boucher | ................. | H04L 63/12 |
| | | | | 380/247 |
| 2006/0240184 A1* | 10/2006 | Ochiai | .................... | B23H 1/06 |
| | | | | 427/140 |
| 2006/0248449 A1* | 11/2006 | Williams | ................ | G06F 9/451 |
| | | | | 715/209 |
| 2006/0248451 A1* | 11/2006 | Szyperski | ............... | G06F 9/451 |
| | | | | 715/209 |
| 2010/0070448 A1* | 3/2010 | Omoigui | .......... | H01L 27/14647 |
| | | | | 706/47 |
| 2012/0246157 A1* | 9/2012 | Theimer | ................... | G06F 8/77 |
| | | | | 707/736 |
| 2012/0278321 A1* | 11/2012 | Traub | ................. | G06F 16/3331 |
| | | | | 707/736 |
| 2012/0330869 A1* | 12/2012 | Durham | ................. | G06N 5/022 |
| | | | | 706/16 |
| 2013/0173618 A1* | 7/2013 | Banville | .............. | G06K 9/6253 |
| | | | | 707/736 |
| 2014/0167963 A1* | 6/2014 | Ferragne | ............ | G08B 13/2462 |
| | | | | 340/572.1 |
| 2014/0310243 A1* | 10/2014 | McGee | ................... | G06F 16/27 |
| | | | | 707/639 |
| 2015/0137948 A1* | 5/2015 | Yap | .................... | G06K 19/0716 |
| | | | | 340/10.1 |
| 2016/0315943 A1* | 10/2016 | Manjunath | .............. | H04L 63/20 |
| 2017/0171146 A1* | 6/2017 | Sharma | ............... | H04L 67/2804 |
| 2018/0367466 A1* | 12/2018 | Shear | ...................... | H04L 63/10 |
| 2019/0034468 A1* | 1/2019 | Wang | ................. | G06F 16/2282 |
| 2019/0243655 A1* | 8/2019 | Milburn | ............... | G06F 21/575 |
| 2019/0325262 A1* | 10/2019 | Stein | ..................... | G06K 9/6228 |
| 2019/0340094 A1* | 11/2019 | Lu | ....................... | G06F 11/3447 |

OTHER PUBLICATIONS

"Oracle Cloud Infrastructure Documentation", Oracle Cloud, https://docs.cloud.oracle.com/iaas/Content/Identity/Concepts/taggingoverview.htm, 2018, 14 pgs.

"Labels and Selectors", Kubernetes, https://kubernetes.io/docs/concepts/overview/working-with-objects/labels/, Mar. 7, 2019, 8 pgs.

* cited by examiner

MULTI-DIMENSIONAL TAGGING NAMESPACE FOR CLOUD RESOURCE MANAGEMENT

TECHNICAL FIELD

The present invention relates generally to cloud resource management and, more specifically, to a structured namespace for tags used to manage cloud resources.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver services online via a remote server, which can be accessed via a web service and/or software, such as a web browser. Individual clients can run virtual machines (VMs) that utilize these services and store the data in the networked computing environment. This can allow a single physical server to host and/or run many VMs simultaneously.

In a cloud native environment, tags and labels are becoming increasingly more common for managing various types of resources. These tags and labels allow a user to group and organize cloud computing resources he or she wishes to use. While some cloud resources providers have tag/label naming rules specific to that provider, there are no uniform techniques to manage tags/labels. This generally results in users or the enterprises for which they work creating user or enterprise-specific tag-naming conventions and/or other tag policies in order to maintain consistency between tags. However, when these self-imposed naming conventions and policies are not strictly followed, such as when two users of an enterprise use even slightly differing naming conventions within the same resource pool, the cloud environment can be left susceptible, for example, to service interruptions and other failures.

Several endeavors into the field of resource tagging have been made, including, for example, the following.

U.S. Patent Application Publication 2012/0246157 discloses: "dynamically tagging metrics data" through a "virtualization infrastructure [ ] that can manage and reserve computer resources for the user during a future usage time period."

U.S. Pat. No. 9,934,269 discloses: "A resource groups service [that] allows customers and/or other users of the service provider network to view and access collections of computing resources that share common resource tags and/or other attributes."

U.S. Patent Application Publication 2016/0315943 discloses: techniques "to provide fine grained protection of resources in an access management environment."

U.S. Pat. No. 9,787,598 discloses: "monitoring and managing information technology (IT) resources" with "tags that correspond to conditions that alert the resource manager when to begin actively managing the IT resource."

SUMMARY

Approaches presented herein provide for generation of a multi-dimensional tag metric in a cloud resource management environment. More specifically, a tagging namespace is provided for managing a resource in the cloud resource management environment. This namespace comprises at least two dimensions and a plurality of positions. A set of tags associated with the resource are received into the tagging namespace. A match of each tag of the set of tags to a position within the namespace into which that tag was received is verified and an alert is triggered in the case verification fails. Alternatively, in the case verification is successful, the tag-containing namespace is validated as a multi-dimensional tag metric.

One aspect of the present invention includes a method for generating a multi-dimensional tag metric in a cloud resource management environment. The method comprises providing a tagging namespace for managing a resource in the cloud resource management environment, the namespace comprising at least two dimensions and a plurality of positions. The method further comprises receiving a set of tags associated with the resource into the tagging namespace. Further, the method comprises verifying a match of each tag of the set of tags to a position within the namespace into which that tag was received. The method also comprises triggering an alert in the case of a failure to verify a match of a tag of the set of tags to a position. This method offers several advantages, such as, but not limited to, organizing tags securely and ensuring compliant tag usage upon initial tagging of a resource, thereby preventing careless, potentially detrimental tag usage.

The method may optionally further comprise each position in the tagging namespace being associated with a set of properties controlling a category of tag eligible to be placed in that position. This method offers several advantages, such as, but not limited to, creating a predetermined location that identifies each tag, facilitating organization and tracking of resource tags.

The method may optionally further comprise identifying at least one tag of the set of tags as corresponding to a property of a position of the plurality of positions, and inputting the identified tag into the position with the corresponding property in the tagging namespace. This method offers several advantages, such as, but not limited to, tying a tag to a particular tag identity for later ease of reference.

The method may optionally further comprise generating a container metadata metric comprising a plurality of positions corresponding to the plurality of positions of the tagging namespace, wherein each position of the container metadata metric contains an indication of the set of properties associated with the corresponding position in the namespace. This method may further comprise generating a tag metadata metric comprising a plurality of positions corresponding to the plurality of positions of the tagging namespace, wherein a set of positions of the tag metadata metric contain an indication of the tag of the received set of tags inserted into the corresponding position in the namespace. This method may also comprise validating the tag-containing namespace as a multi-dimensional tag metric in the case that the occupied positions of the tag metadata metric match corresponding positions of the container metadata metric. This method offers several advantages, such as, but not limited to, preemptively identifying misuse, misidentification, and other failures of resource tags before such failings can negatively impact the cloud computing environment.

The method may optionally further comprise the alert comprising an indication of which tag of the set of tags or position of the set of positions failed the matching. This method offers several advantages, such as, but not limited to, offering a user or administrator an opportunity to identify an erroneous tag or an erroneously placed tag and to correct the tag before the resource to which the tag is attached is employed.

The method may optionally further comprise validating the tag-containing namespace as a multi-dimensional tag metric in the case of a successful match of each tag of the set of tags to the position within the namespace into which that tag was received. This method offers several advantages, such as, but not limited to, creation of a tag metric that includes additional information about the tags contained therein, permitting for streamlined scaling, migrating, balancing, etc.

The method may optionally further comprise performing, using the multi-dimensional tag metric, at least one task selected from the group consisting of: scaling the resource, migrating the resource from a first cloud platform to a second cloud platform, and balancing the resource across a cloud platform. This method offers several advantages, such as, but not limited to, increasing an efficiency with which cloud resource management tasks may be performed.

Another aspect of the present invention includes a computer system for multi-dimensional tag metric in a cloud resource management environment, the computer system comprising: a memory medium comprising program instructions; a bus coupled to the memory medium; and a processor, for executing the program instructions, coupled to a tag namespace engine via the bus that when executing the program instructions causes the system to: provide a tagging namespace for managing a resource in the cloud resource management environment, the namespace comprising at least two dimensions and a plurality of positions; receive a set of tags associated with the resource into the tagging namespace; verify a match of each tag of the set of tags to a position within the namespace into which that tag was received; and trigger an alert in the case of a failure to verify a match of a tag of the set of tags to a position.

Yet another aspect of the present invention includes a computer program product for generating a multi-dimensional tag metric in a cloud resource management environment, the computer program product comprising a computer readable hardware storage device, and program instructions stored on the computer readable hardware storage device, to: provide a tagging namespace for managing a resource in the cloud resource management environment, the namespace comprising at least two dimensions and a plurality of positions; receive a set of tags associated with the resource into the tagging namespace; verify a match of each tag of the set of tags to a position within the namespace into which that tag was received; and trigger an alert in the case of a failure to verify a match of a tag of the set of tags to a position.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
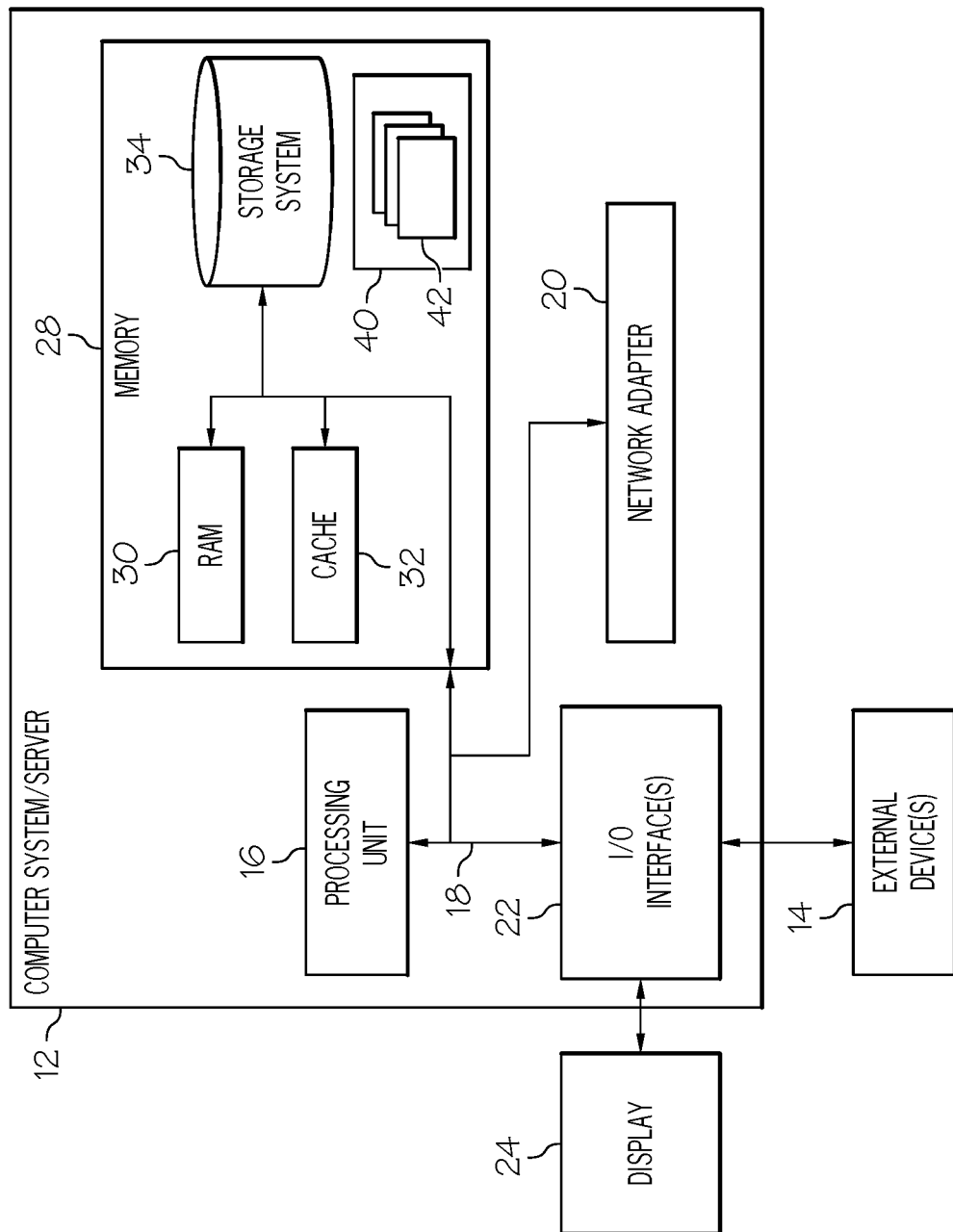
FIG. 1 depicts an architecture in which the invention may be implemented according to illustrative embodiments of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for generation of a multi-dimensional tag metric in a cloud resource management environment. More specifically, a tagging namespace is provided for managing a resource in the cloud resource management environment. This namespace comprises at least two dimensions and a plurality of positions. A set of tags associated with the resource are received into the tagging namespace. A match of each tag of the set of tags to a position within the namespace into which that tag was received is verified and an alert is triggered in the case verification fails. Alternatively, in the case verification is successful, the tag-containing namespace is validated as a multi-dimensional tag metric.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node for generating a multi-dimensional tag metric in a cloud resource management environment will be shown and described. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 is intended to represent any type of computer system/server that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 may be practiced in distributed cloud computing environments where tasks are performed by remote processing devices that are linked through a communications network. In a distributed cloud computing environment, program modules may be located in both local and remote computer system storage media including memory storage devices.

Computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for generating a multi-dimensional tag metric in a cloud resource management environment, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
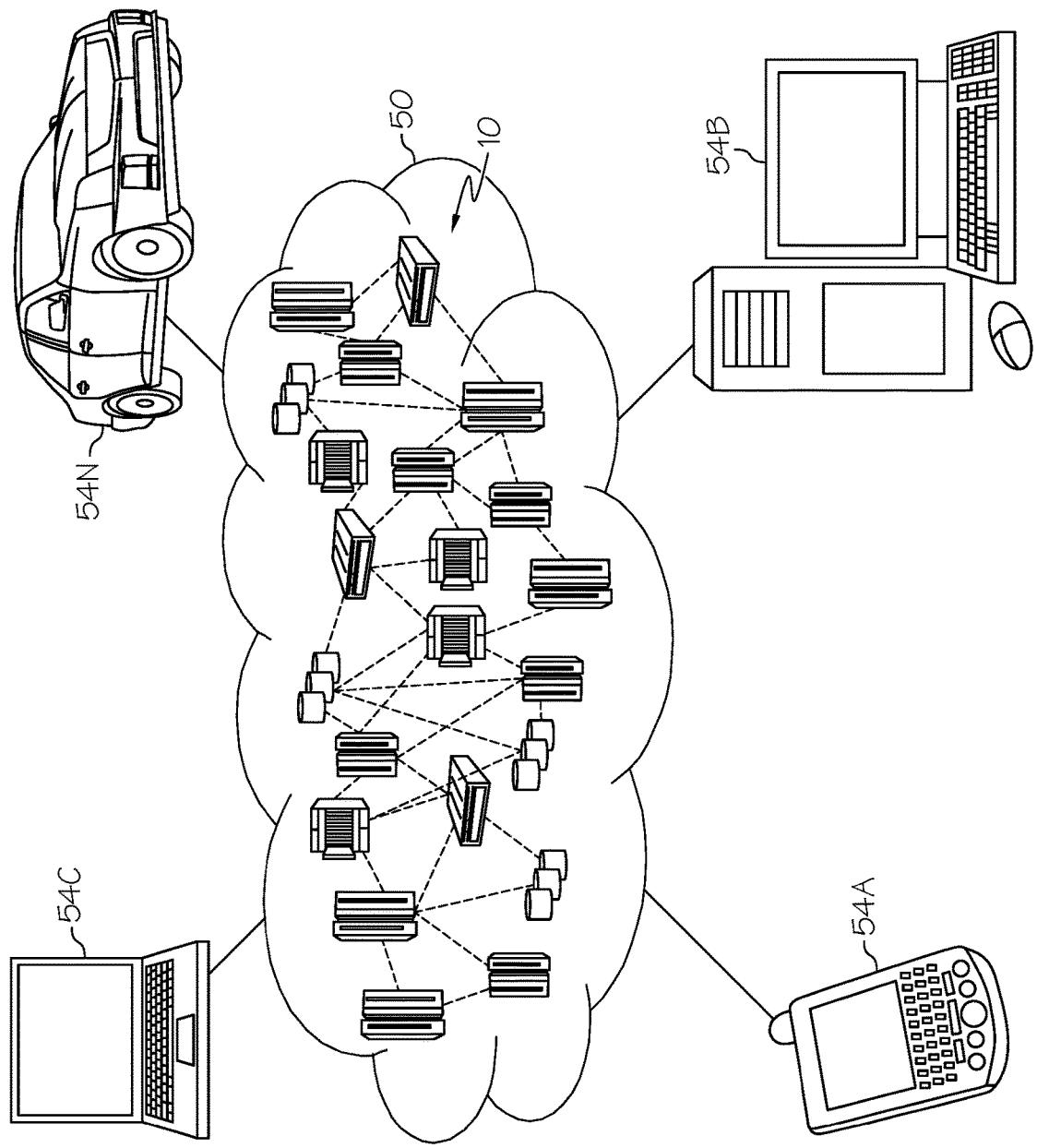
FIG. 2 depicts a cloud computing environment according to illustrative embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
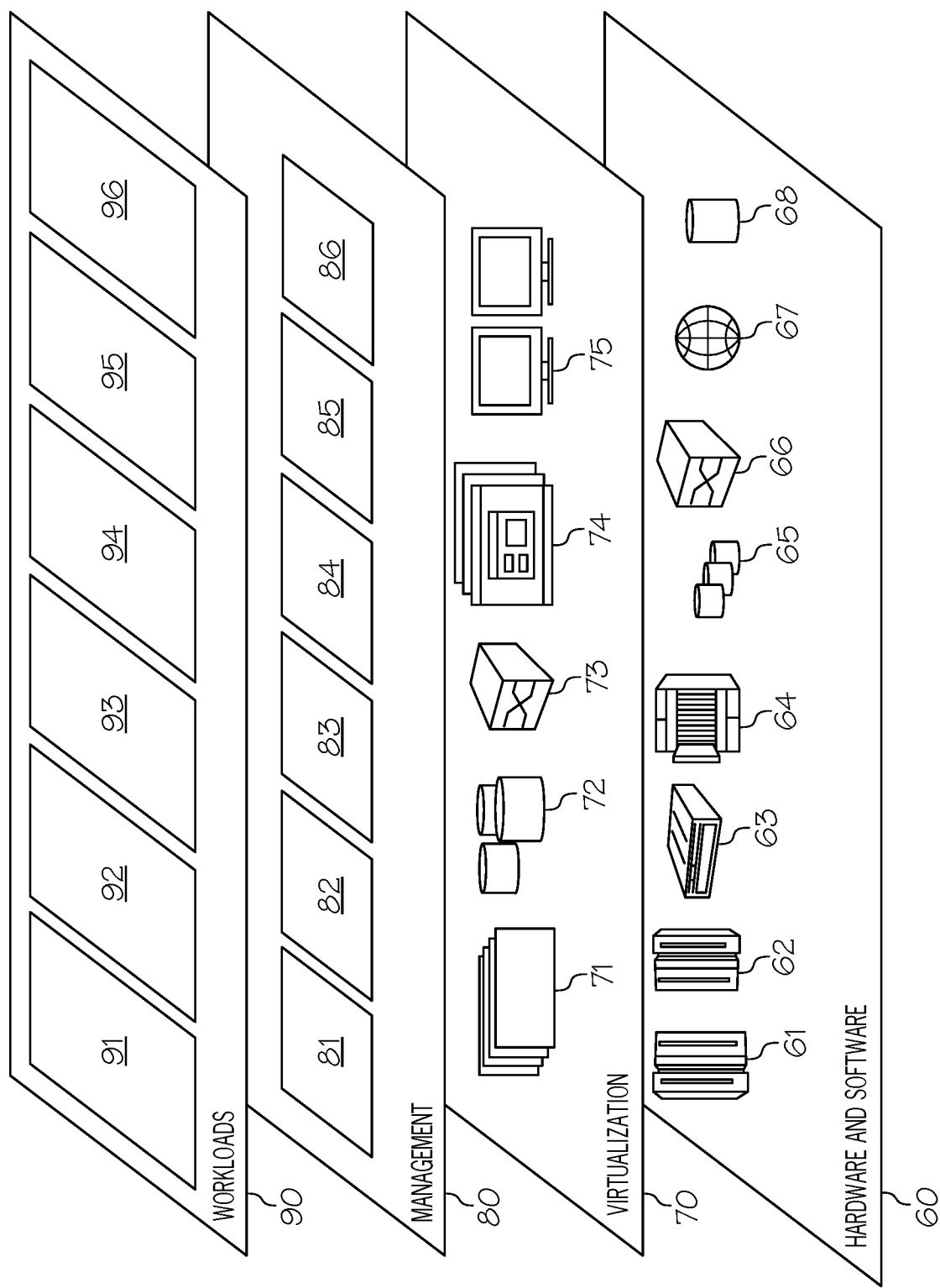
FIG. 3 depicts abstraction model layers according to illustrative embodiments of the present invention of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Tagging namespace management 86 provides the functionality of the present invention, as described in more detail further below.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95, and inventory management 96. As mentioned above, all of the foregoing examples described with respect to FIG. 3 are illustrative only, and the invention is not limited to these examples.

It is understood that all functions of the present invention as described herein typically may be performed by the tagging namespace management 86 functionality (of management layer 80, which can be tangibly embodied as modules of program code 42 of program/utility 40 (FIG. 1). However, this need not be the case. Rather, the functionality recited herein could be carried out/implemented and/or enabled by any of the layers shown in FIG. 3.

It is reiterated that although this disclosure includes a detailed description on cloud computing, implementation of the teachings recited herein are not limited to a cloud computing environment. Rather, some embodiments of the present invention are intended to be implemented with any type of networked computing environment now known or later developed.

The inventors of the present invention have found that there are several deficiencies in present cloud resource management techniques, particularly as concerns tags and labels. While tags are simple metadata labels, generally including a user-defined key and optionally a value used to make resource management, searches, and filtering easier, these tagging solutions involve no uniform rules. Users or enterprises are generally left to define their own tag-naming conventions and other policies, requiring both proactive (e.g., developing and instituting such policies) and reactive (e.g., administrators tasked with finding and removing improper tags) techniques to enforce. In some cases, careless tagging by a user can result in failures to provide cloud resources, such as in-service interruptions and other complications from improperly applied tags. In some cases, administrators react to such improper tagging by terminating untagged or improperly tagged resources and escalating such failures to higher administrators or service managers.

Accordingly, the inventors of the present invention have developed a system that structures tags assigned to a resource and permits management of tags/labels in two or more dimensions. This system, among other things, can verify that a tag conforms to a tagging policy, ensure that necessary tags are assigned to a resource, and promote best tagging practices in real time, as tags are created. As such, tags/labels are organized securely and careless tag/label usage is prevented. Embodiments of the present invention offer several advantages. For example, embodiments allow cloud resource administrators to manage tags/labels in a fine-grained way with increased authorization control. In another example, embodiments provide an intelligent solution for tag/label verification and selection. In still another example, embodiments offer techniques for weighting tags with a weight factor for use in scaling across resources and platforms.

Figure 4:
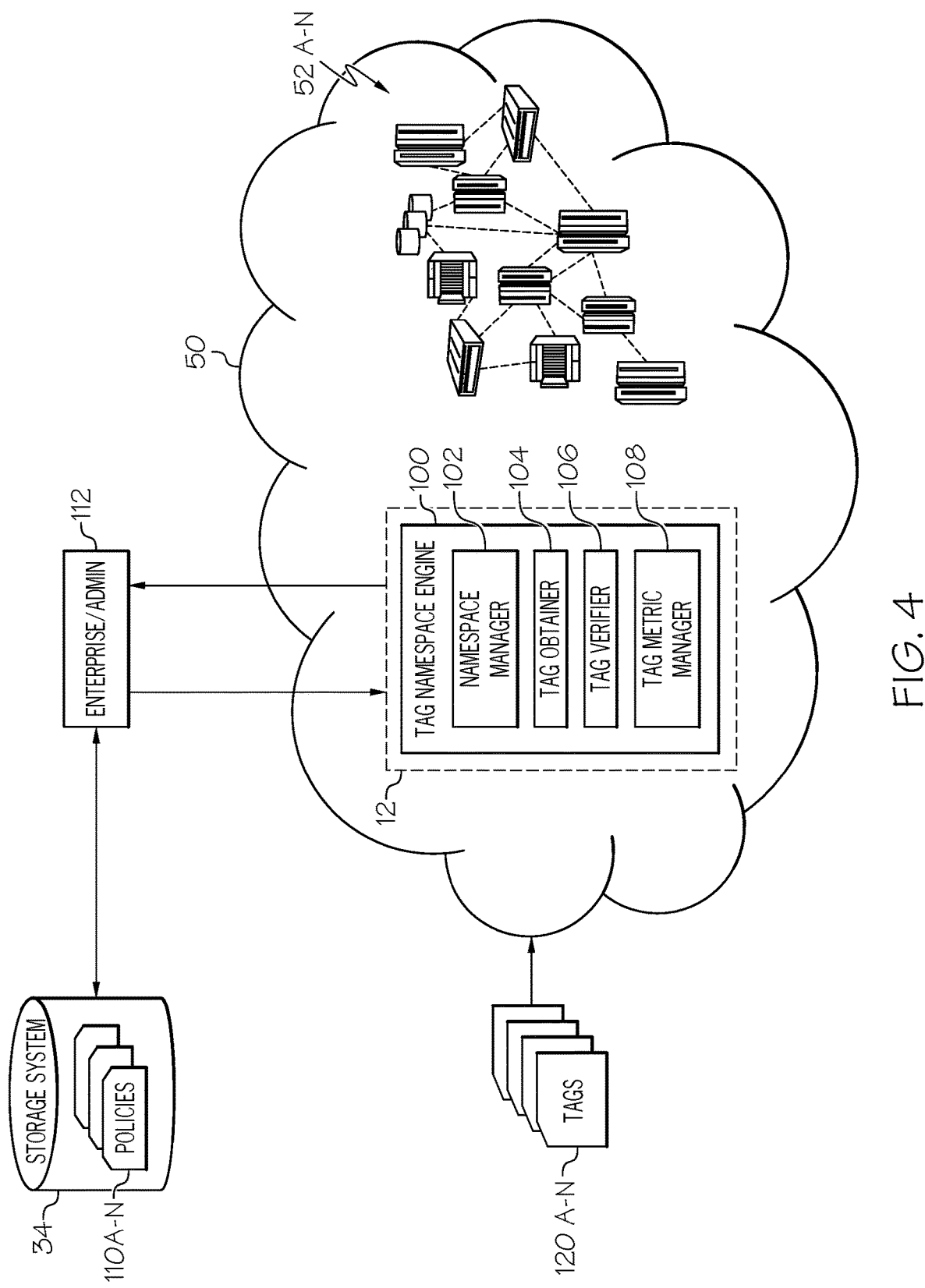
FIG. 4 depicts a system diagram describing the functionality discussed herein according to illustrative embodiments of the present invention.

Referring now to FIG. 4, a system diagram describing the functionality discussed herein according to an embodiment of the present invention is shown. A stand-alone computer system/server 12 is shown in FIG. 4 for illustrative purposes only. In the event the teachings recited herein are practiced in a networked computing environment, each client need not have a tagging namespace engine 100 (hereinafter "system 100"). Rather, all or part of system 100 could be loaded on a server or server-capable device that communicates (e.g., wirelessly) with the clients to provide for generating a multi-dimensional tag metric in a cloud resource management environment. Regardless, as depicted, system 100 is shown within computer system/server 12. In general, system 100 can be implemented as program/utility 40 on computer system 12 of FIG. 1 and can enable the functions recited herein.

Among other functions, system 100 can manage a tagging namespace in a networked or cloud computing environment 50, which can include cloud computing resources 52A-N ("52N" in the singular) and other objects. To accomplish this, system 100 can include a set of components (e.g., program modules 42 of FIG. 1) for carrying out embodiments of the present invention. These components can include, but are not limited to, namespace manager 102, tag obtainer 104, tag verifier 106, and tag metric manager 108.

Through computer system/server 12, system 100 can be in communication with one or more enterprises 112 or enterprise administrators (or other organizations) having a set of tagging/labeling policies or conventions 110A-N ("110N" in the singular) stored, for example, in storage system 34. According to some embodiments of the present invention, system 100 can receive/obtain a set of tags 120A-N ("120N" in the singular) for tagging or labeling a resource 52N. It should be understood that the terms tag and label are used interchangeably herein, and that solutions for tagging a resource can be applied to labeling the resource, and solutions for labeling a resource can be applied to tagging the resource.

Figure 5:
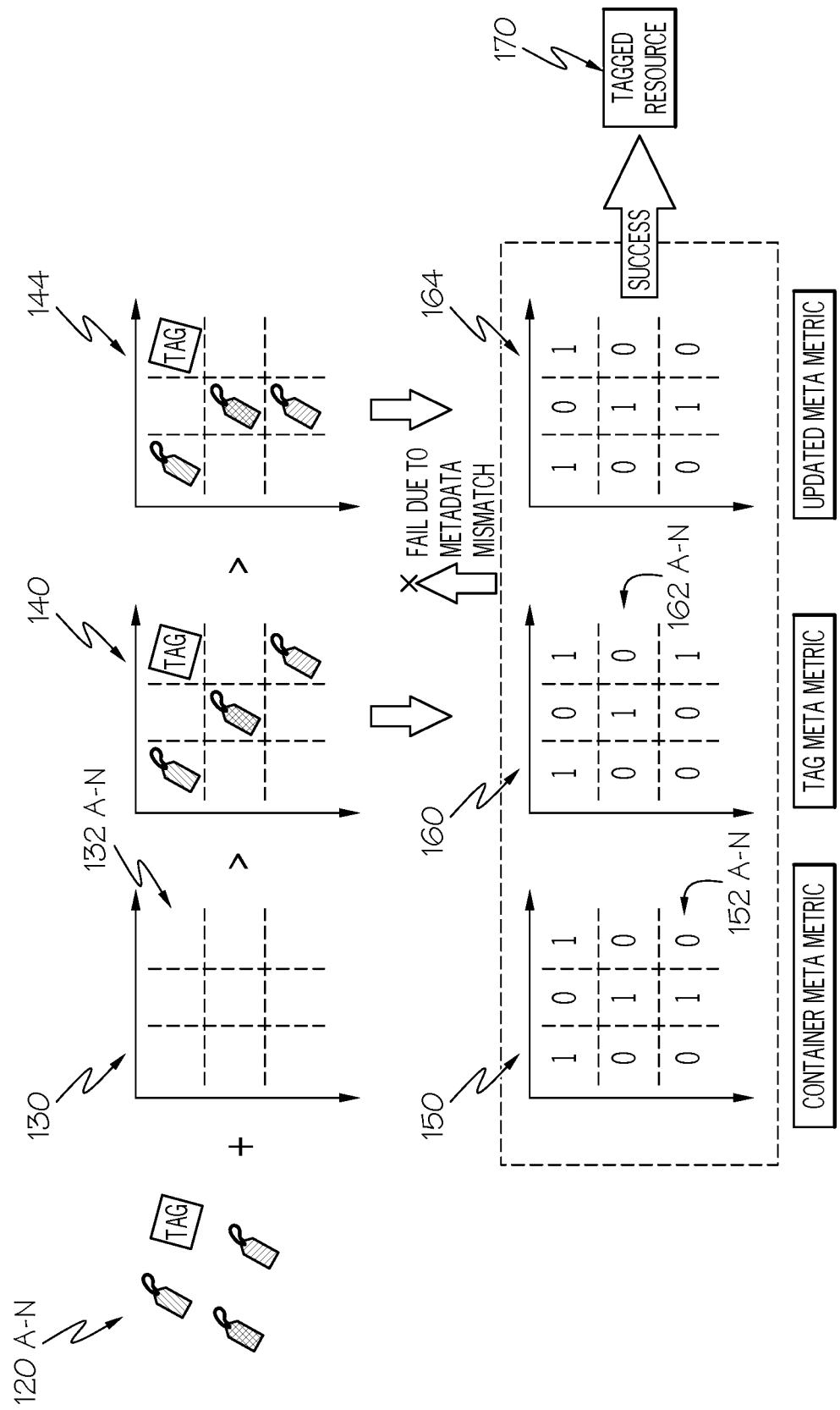
FIG. 5 depicts managing reception of a set of tags for a resource in a cloud computing environment into a tag namespace according to illustrative embodiments.

Referring now to FIG. 5 in connection with FIG. 4, management of a set of tags for a resource in a cloud computing environment according to illustrative embodiments is shown. Namespace manager 102, as performed by computer system/server 12, can provide a tagging namespace 130 for managing a resource 52N in a cloud resource management environment. Tagging namespace 130 can include at least two dimensions and several positions 132A-N ("132N" in the singular). According to some embodiments of the present invention, tagging namespace 130 is a multi-dimensional (i.e., at least two dimensional) metric. In one example, a 2-D tagging namespace can be visualized as a matrix, having a vertical and horizontal dimension. Each position 132N in tagging namespace 130 can be associated with a particular attribute indicating a type, category, or other feature of a tag that can be received into that position 132N. For example position (1,1) could be reserved for an environment tag, while position (1,2) is reserved for an authorization tag. In some embodiments, all positions 132A-N in a particular row or column can be associated with a particular classification of tag, for ease of organization. For example, each position 132N in a first column could be associated with technical tags, such as name (1,1), application ID (1,2), application role (1,3), cluster (1,4), environment (1,5), and version (1,6); while each position 132N in a second column could be associated with automation tags, such as date/time (2,1), opt in/opt out (2,2), and security (2,3). Other tag types can include business tags (e.g., owner (3,1), cost center/business unit (3,2), customer (3,3), and project (3,4)) and security tags (e.g., confidentiality (4,1) and compliance (4,2)).

According to some embodiments of the present invention, an administrator 112 can provide container properties to create the association of each position 132N with a particular type of tag. In still other embodiments, definition of container properties can be automated. For example, namespace manager 102 can generate a namespace 130 for a resource 52N and define positions 123A-N in namespace 130 based on tags expected to be associated with that type of resource 52N. This automated container properties definition can be accomplished based on, for example, historical data of previous namespaces 130 created for other similar (e.g., in a same class) resources 52A-N. In any case, according to some embodiments of the present invention, container properties can be defined prior to receipt of actual tags 120A-N. In some embodiments, the properties of each position 132N are based on tagging/labeling policies or conventions 110A-N associated with enterprise/administrator 112.

Furthermore, administrator 112 or namespace manager 102 can define some positions 132A-N as requiring/mandating a tag to be entered therein for validation, while permitting other positions 132A-N to be optional. For example, a security tag controlling access to resource 52N could be mandatory, while an automation tag, capable to turning a resource on or off at a particular time, could be optional. In some embodiments, administrator 112 or namespace manager 102 can configure a position 132M to trigger an image compliance test, as will be discussed further below, in the case that there is a tag on that position 132M. For example, in the case that position 132M is for a security tag, it would be desirable to trigger a compliance check to ensure that a tag corresponding to a correct level of authorization was inserted into that position 132M.

Tag obtainer 104, as performed by computer system/server 12, can receive a set of tags 120A-N associated with resource 52N into tagging namespace 130. These tags can be provided to or otherwise obtained by tag obtainer 104 from a user or other source, such as an automated program. Tag obtainer 104 can obtain tags 120A-N at any point at which tags would normally be entered, such as during creation of, assignment of, or request for a resource. In any case, in some embodiments, tag obtainer 104 provides a user with an interface allowing the user to enter tags 120A-N into namespace 130 him or herself. In this embodiment, the interface can include instructions concerning which types of tags are to be placed in which positions 132A-N. It should be understood that tags 120A-N include a group of essentially random, unorganized key-value pairs (e.g., vmrole: webserver, env:production, location:west), as are generally used in cloud resource management. In some other embodiments, tag obtainer 104 obtains tags 120A-N in "loose/bulk form" from the user and forwards tags 120A-N to administrator 112 for structured entry into tag namespace 130.

In still some other embodiments, tag obtainer 104 can obtain tags 120A-N in "loose/bulk form" from the user and input each tag 120N into an appropriate position 132N in the tagging namespace 130. This can be accomplished, for example, by identifying each tag 120N of the set of tags 120A-N based on the key of the tag's key/value pair and matching that key to an appropriate container property in namespace 130. A particular tag namespace position 132N can be configured to accept several different keys (e.g., "env" and "environment") based on that key having a particular significance, even if there are multiple ways in which that significance can be written. In some embodiments, matching a tag 120N to a position 132N can be based on other properties assigned to that particular position.

Tag obtainer 104 inserts tags 120A-N into tagging namespace 130, forming a multi-dimensional metric 140 composed of the tags in a structured form. This evolves tags 120A-N from a group of random key-value pairs to a new server tag structured as a two or more dimensional metric 140. As such, not only do tags 120A-N provide metadata, but their placement in multi-dimensional metric 140 acts as additional metadata identifying each tag's significance or function. This permits easy and uniform tag identification, even across different naming conventions, cloud platforms, etc.

Tag verifier 106, as performed by computer system/server 12, can verify a match of each tag 120N of the set of tags 120A-N to a position 132N within the namespace 130 into which that tag 120N was received. To accomplish this, tag verifier 106 generates a container metadata metric 150. Container metadata metric 150 is a multi-dimensional metric paralleling tag namespace 130. Container metadata metric 150 contains information in each position 152N based on the properties of parallel tag namespace position 132N, which will be used to verify whether a tag entered into tag namespace position 132N belongs in that tag namespace position 132N. Tag verifier 106 also generates a tag metadata metric 160. Tag metadata metric 160 is a multi-dimensional metric paralleling actual tags 120 A-N entered into multi-dimensional metric 140. Based on the particular tag 120N entered into a particular tag namespace position 132N, tag verifier 106 generates information in a corresponding tag metadata metric position 162N describing that particular tag 120N. Tag verifier 106 can then compare tag metadata metric 160 to container metadata metric 150. In the case a position in multi-dimensional metric 140 is empty or otherwise does not contain a tag, the corresponding position in tag metadata metric 160 can include an instruction to disregard that position for the purpose of comparison. In the event tag metadata metric 160 matches container metadata metric 150, tag verifier 106 can verify multi-dimensional metric 140 as valid. For example, in some embodiments, tag verifier 106 can verify that all tags for a newly created resource match enterprise tag/label conventions 110A-N by checking that tag 120N in position 132N satisfies the properties assigned to position 132N. In still another example, tag verifier 106 can ensure that all mandatory tag positions of positions 132A-N actually have a tag occupying them. This verification of multi-dimensional metric 140 acts as a preventative measure to ensure that tagged resources 170 are not created with careless tag usage that could negatively impact the cloud computing environment.

In the alternative event, however, tag verifier 106, as performed by computer system/server 12, can trigger an alert in the case of a failure to verify a match of a tag 120N of the set of tags 120A-N to a position 132N. This alert can include a notification (e.g., in-program/application alert, email, system alert, etc.) to the user who submitted tags 120A-N to tag obtainer 104 and/or to administrator 112. This alert can include an indication that verification has failed. In some embodiments, this alert can also include an indication of which tag(s) 120N and/or position(s) 132N caused the failure. In still other embodiments, this alert can include a suggested change to update multi-dimensional metric 140 to make multi-dimensional metric 140 capable of being successfully verified. Such suggestion can be based on, for example, a policy broken by a particular tag 120N or a placement of a particular tag 120, a correct position into which to place the particular tag 120N, or an error with tag 120N itself (e.g., a spelling error). Tag verifier 106 can offer the user and/or administrator 112 an opportunity to update multi-dimensional metric 140 into updated multi-dimensional metric 144 to make the metric capable of being successfully verified. As before, such subsequent verification can be performed by generating updated tag metadata metric 164 for comparison against container metadata metric 150.

According to some embodiments, tag obtainer 104 and/or tag verifier 106 can automatically update/correct multi-dimensional metric 140 into updated multi-dimensional metric 144 to make the metric capable of being successfully verified. In some embodiments, updated multi-dimensional metric 144 can be presented to the user and/or administrator 112 for confirmation before or after successful verification. Such automatic correction may be accomplished, for example, by a learning system that logs and learns from previous errors and techniques used by users/administrators to correct multi-dimensional metric 140 into updated metric 144.

Further, in some embodiments, tag obtainer 104 and/or tag verifier 106 can provide the user with best practices for using tags properly within a cloud provider, enterprise, or an industry. In some embodiments, these best practices can be provided to the user in response to a failure to verify a match of a tag 120N of the set of tags 120A-N to a position 132N. In some other embodiments, these best practices can be provided to the user automatically or in response to a request from the user. For example, when tag obtainer 104 is obtaining tags 120A-N from the user, tag obtainer 104 can inform the user of best tagging practices for each type of tag that the user is entering. For instance, if the user has opened a data field to enter a tag 120N into a particular position 132N, tag obtainer 104 can generate a popup or other notification that indicates a type of tag associated with position 132N, common naming conventions for such a tag under an enterprise's policies, etc. These best practices can be learned or otherwise derived from tagging/labeling policies or conventions 110A-N associated with enterprise/administrator 112, historical tag usage, etc.

In some embodiments, tag verifier 106 can also be configured to trigger an image compliance check procedure in response to a tag being in a particular position in multi-dimensional metric 140. More specifically, namespace manager 102 can configure a particular position 132N with binding hooks or other predefined hooks to perform a particular task when particular position 132N is occupied with a tag. Such action can include, for example, a further verification of not simply an appropriateness of a tag 120N in a particular position 132N, but also whether the value of the key/value pair is correct for the resource to which tag 120N is assigned. For example, in the case that an editor/viewer security tag is attached to a resource in a security tag position 132N of namespace 130, tag verifier 106 can check a level of clearance granted by the tag to particular users. Tag verifier 106 can compare this clearance level against previous instances of resources with similar type security tags or a set of rules created by enterprise/administrator 112 (e.g., all X resources must have at least Y level of security). In the event that the tag applies a security level inconsistent with historical data or other rules, tag verifier 106 can invalidate the multi-dimensional metric 140 in which the tag resides. As described above, tag verifier 106 can then, in response to the failed verification, send a notification to a user/administrator informing them of the error and await an updated metric 144 and/or correct the tag automatically to comply with the rules or historical data.

Figure 6A:
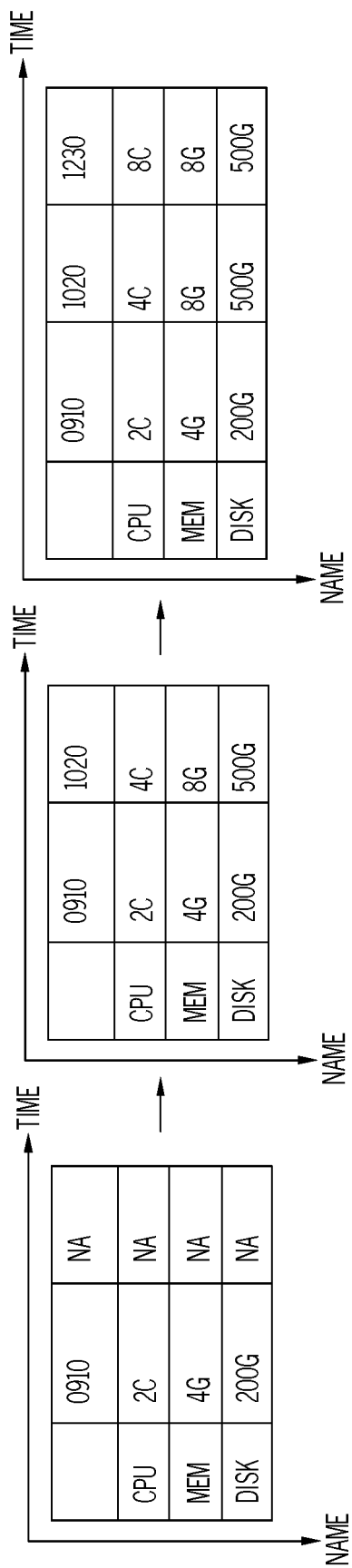
FIGS. 6A and 6B depict several example usages of a multi-dimensional metric in a cloud resource management environment according to illustrative embodiments.
Figure 6B:
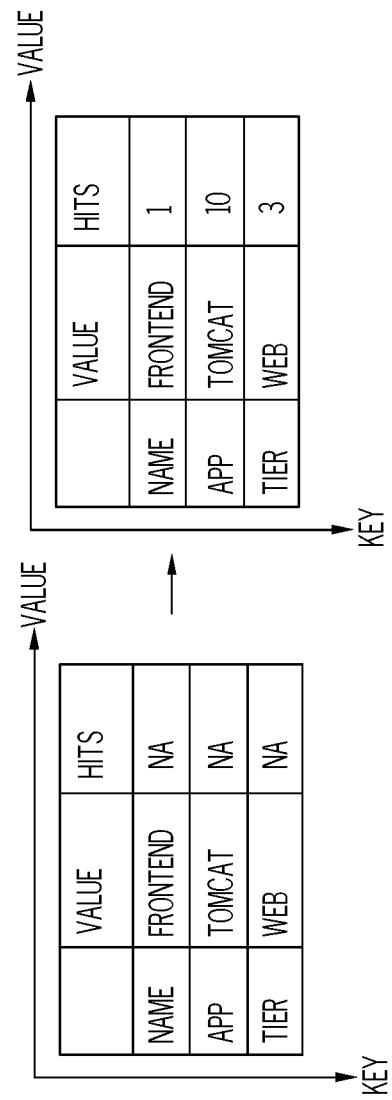

Referring now to FIGS. 6A and 6B in connection with FIG. 4 and FIG. 5, example usages of a multi-dimensional metric in a cloud resource management environment according to illustrative embodiments are shown. Once multi-dimensional metric 144 is validated, multi-dimensional metric 144 can be used in a variety of useful applications to facilitate control in the cloud resource management environment. For example, validated multi-dimensional metric 144 can be used to facilitate scaling, resource balancing, and migration and mapping across cloud provider platforms, and is not limited to these applications. More specifically, tag metric manager 108, as performed by computer system/server 12, can perform, using multi-dimensional tag metric 144, at least one task selected from the group consisting of: scaling a resource, migrating the resource from a first cloud platform to a second cloud platform, and balancing the resource across a cloud platform.

In a first example, validated multi-dimensional metric 144 can be used to migrate and map across cloud provider platforms. Currently, there are several practical difficulties with migrating across cloud provider platforms. For instance, in addition to naming policies instituted individually by each enterprise using a cloud provider platform, each platform itself also has different limits and restrictions on tags, including keys and values. For example, Azure permits keys 512 characters in length, while Amazon Web Services (AWS) permits only 127 characters, and Google Compute Products (GCP) permits only 63 character length keys. Further, AWS tags are case sensitive, while Azure tags are not, and GCP tags can have only lowercase characters. Moreover, Azure is limited to 15 tags per resource, while AWS and GCP permit 50 and 64 tags, respectively. All trademarks and trade names used herein are the property of their respective owners and are used for illustrative and descriptive purposes only.

In any case, returning to the present invention, according to some embodiments, tag metric manager 108 can assist in the migration of tagged resource 170 from a first cloud platform to a second cloud platform. The multiple dimensions of multi-dimensional tag metric 144 allow indication of what type of tag 120N resides in each position 132N. Tag metric manager 108 can interpret what each position 132N signifies about tag 120N contained therein, and pass this interpretation to any system, program, application, etc., performing a migration/mapping of tagged resource 170 from the first cloud platform to the second cloud platform. This permits identification of the purpose/function of each tag, making concisely clear how that tag functioned in the first cloud platform and how that tag should continue to function in the second cloud platform. As such, no script is needed to migrate tagged resource 170 to another platform because lines and line positions of multi-dimensional metric 144 indicate, for example, applications, tiers, etc., which would normally need to be communicated through script for migration. Tag metric manager 108 can also adjust tags as needed to comply with the rules of the second cloud platform. For example, a tag that uses capital letters could be modified to use only lowercase characters in a platform that restricts tags to lowercase characters. The modified tag would be kept in the same position 132N of multi-dimensional metric 144, permitting easy continued identification of the function of that tag.

In another example, a group of validated multi-dimensional metrics 144, each for different tagged resources 170, can be used to balance and scale these resources within one or across several cloud provider platforms, disregarding various tag conventions of different cloud platform providers. As with migrating described above, tag metric manager 108 can provide identifying information on each tag 120N of each tagged resource 170 to facilitate transfers of workloads across different resources or platforms during balancing, as well as to facilitate vertical or horizontal scaling of an application and the resources used by that application as needed to handle increased workloads. As described above, this identifying information, derived from the structure of multi-dimensional metric 144, can be used to ensure that tags across different platforms and workloads behave in a uniform manner, without the need for scripts to handle tagging during the transfers, balancing, or scaling. Furthermore, embodiments of the present invention permit equivalent tags across different resources and platforms to be identified and held as equivalent. Metrics for resources identified by these tags can be compared when the tags used to measure resource and application usage and pinpoint areas of highest usage. As such, scaling resources and balancing workloads based on such readily comparable tag metrics is facilitated. Furthermore, in some embodiments, some tag positions can be weighted and the tags residing therein used for a weighted balancing or scaling, permitting a more finely tuned balancing/scaling control across equivalent tags in multiple resources and platforms.

In an example, referring specifically to FIG. 6A, vertical scaling of a server resource is shown. Under previous solutions, when the server resource requires additional resources between times 0910 and 1020 in order to vertically scale, it may be difficult to find appropriate resources due to differences in tag identifiers and failures to correctly tag resources which are actually available. As a result, there may be a delay in obtaining resources necessary to scale the server resource. However, according to embodiments of the present invention, tag metric manager 108 can enable efficient finding of appropriate resources by enabling a scaling process to reference equivalent tags, even across platforms and providers, to find resources best suited for the scaling, as workloads demand. Likewise, multi-dimensional metric 144 provided by tag metric manager 108 can be used to, for example, track the history of a VM's resource scaling, determine when a VM extends its capacity, perform analysis of scaling, and analyze cloud utilization.

In still another example, referring specifically to FIG. 6B, embodiments of the present invention offer a convenient means of tracking which key/value pairs have been used frequently. Multi-dimensional metric 144 provided by tag metric manager 108 can be used to intelligently look for previous tags used to perform a specific function (i.e., in a same tag position 132N) and make sure new tags are consistent with such previous tags. For example, during initial tag obtainment by tag obtainer 104, tag metric manager 108 can provide hits metrics, such as those shown in FIG. 6B, and recommend to the user inputting the tags key/value pairs that are consistent and therefore comply with tag naming policies.

Figure 7:
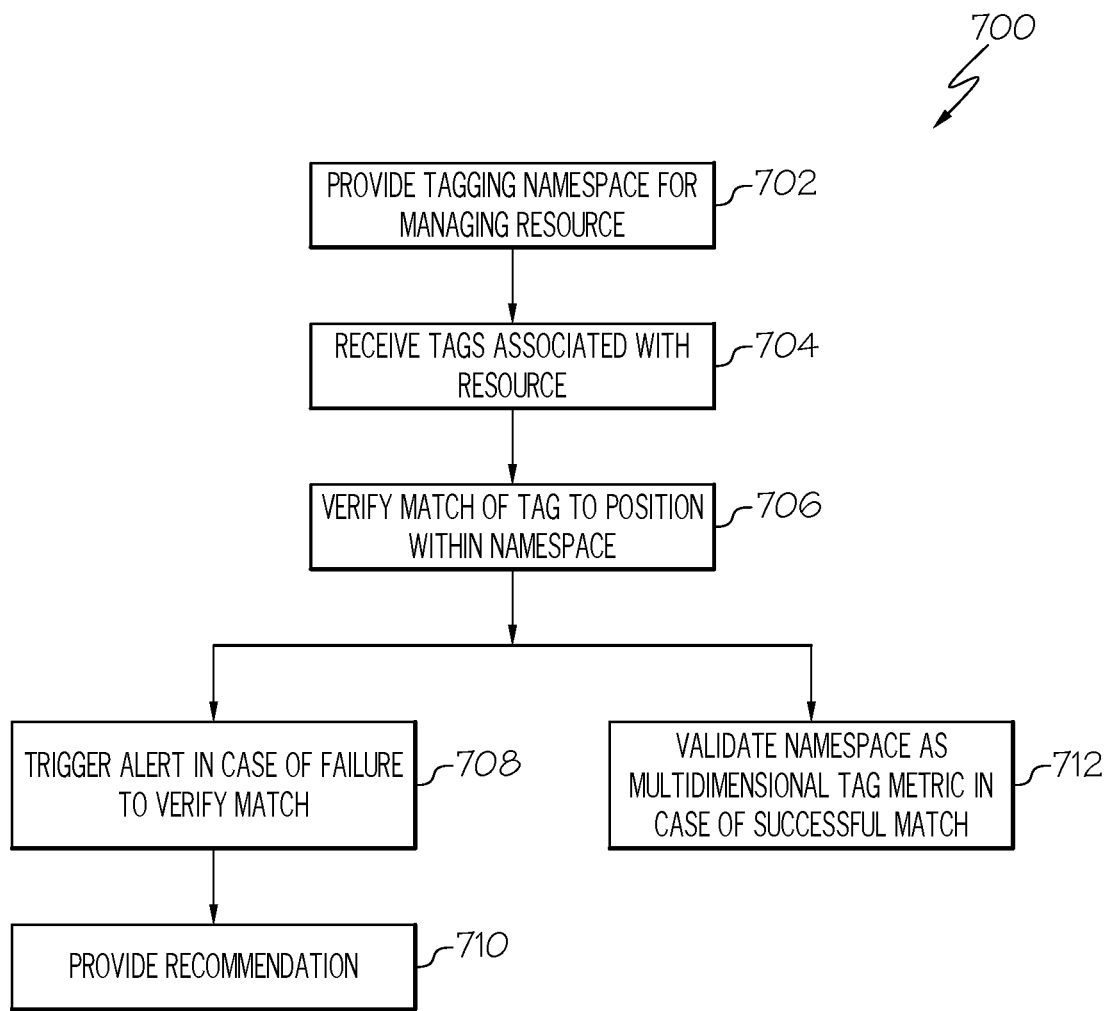
FIG. 7 depicts a process flowchart for generating a multi-dimensional tag metric in a cloud resource management environment according to illustrative embodiments.

As depicted in FIG. 7, in one embodiment, a system (e.g., computer system/server 12) carries out the methodologies disclosed herein. Shown is a process flowchart 700 for generating a multi-dimensional tag metric in a cloud resource management environment. At 702, namespace manager 102 provides a tagging namespace 130 for managing a resource 52N in the cloud resource management environment, the namespace comprising at least two dimensions and a plurality of positions 132A-N. At 704, tag obtainer 104 receives a set of tags 120A-N associated with the resource into the tagging namespace 130. At 706, tag verifier 106 verifies a match of each tag 120N of the set of tags 120A-N to a position 132N within the namespace 130 into which that tag 120N was received. At 708, tag verifier 106 triggers an alert in the case of a failure to verify a match of a tag 120N of the set of tags 120A-N to a position 132N. Optionally, at 710, tag verifier 106 provides, in the alert, information selected from the group consisting of: an indication of which tag 120N of the set of tags 102A-N or position 132N of the set of positions 132A-N failed the matching, a suggested change to at least one tag 120N in the tagging namespace 130, and a recommended best tagging practice. Alternatively, at 712, tag verifier 106 validates the tag-containing namespace 130 as a multi-dimensional tag metric 140 in the case of a successful match of each tag 120N of the set of tags 120A-N to the position 132N within the namespace 130 into which that tag 120N was received.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for generating a multi-dimensional tag metric in a cloud resource management environment. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for generating a multi-dimensional tag metric in a cloud resource management environment. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to generate a multi-dimensional tag metric in a cloud resource management environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for generating a multi-dimensional tag metric in a cloud resource management environment, comprising:
   providing a tagging namespace for managing a resource in the cloud resource management environment, the namespace being a matrix comprising at least two dimensions and a plurality of positions, wherein tags associated with a vector of at least one dimension share a common classification and wherein at least one of the plurality of positions is associated with a task responsive to having a tag received therein;
   receiving a set of tags associated with the resource into the tagging namespace;
   verifying a match of each tag of the set of tags to a position within the namespace into which that tag was received;
   triggering an alert in the case of a failure to verify a match of a tag of the set of tags to a position; and
   performing the task responsive to a tag being received in the at least one of the plurality of positions.

2. The method of claim 1, wherein each position in the tagging namespace is associated with a set of properties controlling a category of tag eligible to be placed in that position.

3. The method of claim 2, the receiving the set of tags further comprising:
   identifying at least one tag of the set of tags as corresponding to a property of a position of the plurality of positions; and
   inputting the identified tag into the position with the corresponding property in the tagging namespace.

4. The method of claim 1, the verifying further comprising:

generating a container metadata metric comprising a plurality of positions corresponding to the plurality of positions of the tagging namespace, wherein each position of the container metadata metric contains an indication of a set of properties associated with a corresponding position in the namespace;

generating a tag metadata metric comprising a plurality of positions corresponding to the plurality of positions of the tagging namespace, wherein a set of positions of the tag metadata metric contain an indication of the tag of the received set of tags inserted into the corresponding position in the namespace; and validating the tag-containing namespace as a multi-dimensional tag metric in the case that the occupied positions of the tag metadata metric match corresponding positions of the container metadata metric.

5. The method of claim 1, wherein the alert comprises information selected from the group consisting of: an indication of which tag of the set of tags or position of the set of positions failed the matching, a suggested change to at least one tag in the tagging namespace, and a recommended best tagging practice.

6. The method of claim 1, the method further comprising validating the tag-containing namespace as a multi-dimensional tag metric in the case of a successful match of each tag of the set of tags to the position within the namespace into which that tag was received.

7. The method of claim 6, the method further comprising performing, using the multi-dimensional tag metric, at least one task selected from the group consisting of: scaling the resource, migrating the resource from a first cloud platform to a second cloud platform, and balancing the resource across a cloud platform.

8. A computer system for generating a multi-dimensional tag metric in a cloud resource management environment, the computer system comprising:
a memory medium comprising program instructions;
a bus coupled to the memory medium; and
a processor, for executing the program instructions, coupled to a tag namespace engine via the bus that when executing the program instructions causes the system to:
provide a tagging namespace for managing a resource in the cloud resource management environment, the namespace being a matrix comprising at least two dimensions and a plurality of positions, wherein tags associated with a vector of at least one dimension share a common classification and wherein at least one of the plurality of positions is associated with a task responsive to having a tag received therein;
receive a set of tags associated with the resource into the tagging namespace;
verify a match of each tag of the set of tags to a position within the namespace into which that tag was received;
trigger an alert in the case of a failure to verify a match of a tag of the set of tags to a position; and
perform the task responsive to a tag being received in the at least one of the plurality of positions.

9. The computer system of claim 8, wherein each position in the tagging namespace is associated with a set of properties controlling a category of tag eligible to be placed in that position.

10. The computer system of claim 9, the instructions further causing the system to:

identify at least one tag of the set of tags as corresponding to a property of a position of the plurality of positions; and input the identified tag into the position with the corresponding property in the tagging namespace.

11. The computer system of claim 8, the instructions further causing the system to:
generate a container metadata metric comprising a plurality of positions corresponding to the plurality of positions of the tagging namespace, wherein each position of the container metadata metric contains an indication of a set of properties associated with a corresponding position in the namespace;
generate a tag metadata metric comprising a plurality of positions corresponding to the plurality of positions of the tagging namespace, wherein a set of positions of the tag metadata metric contain an indication of the tag of the received set of tags inserted into the corresponding position in the namespace; and
validate the tag-containing namespace as a multi-dimensional tag metric in the case that the occupied positions of the tag metadata metric match corresponding positions of the container metadata metric.

12. The computer system of claim 8, wherein the alert comprises information selected from the group consisting of: an indication of which tag of the set of tags or position of the set of positions failed the matching, a suggested change to at least one tag in the tagging namespace, and a recommended best tagging practice.

13. The computer system of claim 8, the instructions further causing the system to validate the tag-containing namespace as a multi-dimensional tag metric in the case of a successful match of each tag of the set of tags to the position within the namespace into which that tag was received.

14. The computer system of claim 13, the instructions further causing the system to perform, using the multi-dimensional tag metric, at least one task selected from the group consisting of: scaling the resource, migrating the resource from a first cloud platform to a second cloud platform, and balancing the resource across a cloud platform.

15. A computer program product for generating a multi-dimensional tag metric in a cloud resource management environment, the computer program product comprising a computer readable hardware storage device, and program instructions stored on the computer readable hardware storage device, to:
provide a tagging namespace for managing a resource in the cloud resource management environment, the namespace being a matrix comprising at least two dimensions and a plurality of positions, wherein tags associated with a vector of at least one dimension share a common classification and wherein at least one of the plurality of positions is associated with a task responsive to having a tag received therein;
receive a set of tags associated with the resource into the tagging namespace;
verify a match of each tag of the set of tags to a position within the namespace into which that tag was received;
trigger an alert in the case of a failure to verify a match of a tag of the set of tags to a position; and
perform the task responsive to a tag being received in the at least one of the plurality of positions.

16. The computer program product of claim 15, wherein each position in the tagging namespace is associated with a set of properties controlling a category of tag eligible to be placed in that position.

17. The computer program product of claim 16, the computer readable storage device further comprising instructions to:
  identify at least one tag of the set of tags as corresponding to a property of a position of the plurality of positions; and
  input the identified tag into the position with the corresponding property in the tagging namespace.

18. The computer program product of claim 15, the computer readable storage device further comprising instructions to:
  generate a container metadata metric comprising a plurality of positions corresponding to the plurality of positions of the tagging namespace, wherein each position of the container metadata metric contains an indication of a set of properties associated with a corresponding position in the namespace;
  generate a tag metadata metric comprising a plurality of positions corresponding to the plurality of positions of the tagging namespace, wherein a set of positions of the tag metadata metric contain an indication of the tag of the received set of tags inserted into the corresponding position in the namespace; and
  validate the tag-containing namespace as a multi-dimensional tag metric in the case that the occupied positions of the tag metadata metric match corresponding positions of the container metadata metric.

19. The computer program product of claim 15, the computer readable storage device further comprising instructions to validate the tag-containing namespace as a multi-dimensional tag metric in the case of a successful match of each tag of the set of tags to the position within the namespace into which that tag was received.

20. The computer program product of claim 19, the computer readable storage device further comprising instructions to perform, using the multi-dimensional tag metric, at least one task selected from the group consisting of: scaling the resource, migrating the resource from a first cloud platform to a second cloud platform, and balancing the resource across a cloud platform.

\* \* \* \* \*